May 24, 1932.  H. LANGE  1,860,038
HEAVY DUTY HOSE COUPLING
Filed Sept. 14, 1931   2 Sheets-Sheet 1
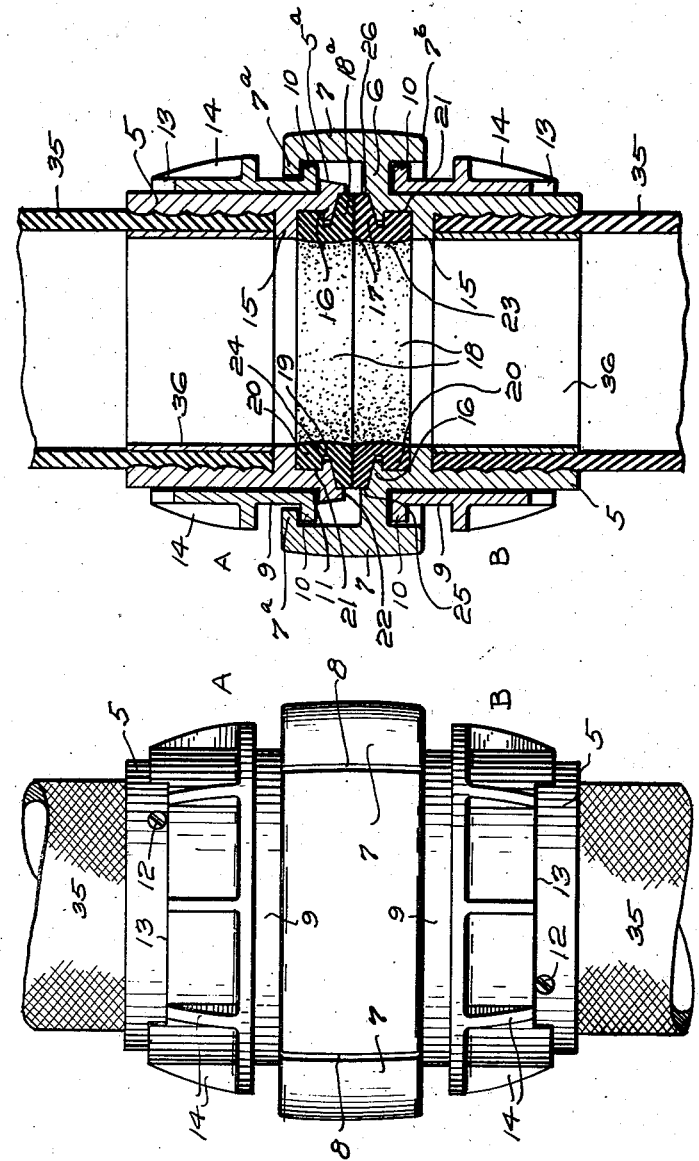
Inventor
Harald Lange,
By Shepherd Campbell
Attorneys May 24, 1932.  H. LANGE  1,860,038
HEAVY DUTY HOSE COUPLING
Filed Sept. 14, 1931   2 Sheets-Sheet 2

Inventor
Harald Lange,
By Shepherd Campbell
Attorneys

Patented May 24, 1932

1,860,038

UNITED STATES PATENT OFFICE

HARALD LANGE, OF PORTLAND, OREGON

HEAVY DUTY HOSE COUPLING

Application filed September 14, 1931. Serial No. 562,783.

This application is a continuation in part of my copending application Serial No. 395,930, filed September 28, 1929.

The object of the invention is to provide a hose coupling having features of superiority with respect to simplicity, economy of construction and ease of connection and disconnection.

A further object of the invention is to provide a hose coupling of what may be termed the heavy duty type adapted for use on fire hose and other hose of relatively large sizes; the coupling being so constructed that even in the confusion and haste attending fire fighting operations, there will be no possibility of getting the connections confused, but upon the contrary either of the connections upon any section will fit either of the connections upon any other hose section, to which end the coupling is so constructed as to provide a pair of interlocking sections, each of said sections being substantially identical in construction so that they are interchangeable.

A further object of the invention is to provide means for locking the movable elements of the hose coupling at their limits of movement in each direction for reasons hereinafter described.

A further and very important object of the invention is to provide an improved type of gasket and cooperating seat for the same upon each of the hose sections, these gaskets and co-acting metal surfaces upon which they rest being so arranged that the water pressure within the coupling will act to force the gaskets into fluid tight contact with each other, and the greater the pressure the tighter the gaskets will seat upon each other.

It is a further object of the invention to provide a hose coupling of the character set forth in which the non-rotatable portions of the coupling sections are centrally disposed with respect to the length of the coupling; are of larger diameter than the manually operable locking sleeves, and are so shaped as to provide a riding surface for the coupling when the latter is dragged over the ground, by virtue of which the manually operable rotatable locking sleeves are protected against being accidentally turned or knocked loose and relieved of the wear and damage which would result if they constituted the principal riding surfaces of the coupling.

Further objects and advantages will be set forth in the detailed description which follows:

In the accompanying drawings

Figure 1 is a side elevation of the completely assembled hose coupling comprising the two sections.

Fig. 2 is a longitudinal sectional view of the structure of Fig. 1.

Like numerals designate corresponding parts in all the figures of the drawings.

While I have described the coupling of the present invention as being a heavy duty coupling and while it is admirably adapted to serve in that capacity, it is to be understood that the principle involved may be embodied in hose couplings of any size.

Referring to Fig. 1, it will be seen that the hose coupling of the present invention comprises two identical sections A and B, and since these sections are alike in construction, a description of one will serve as a description of both.

Figure 3:
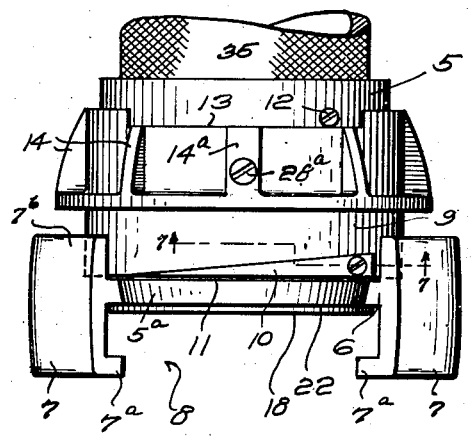
Fig. 3 is a plan view of one of the sections alone.
Figure 4:
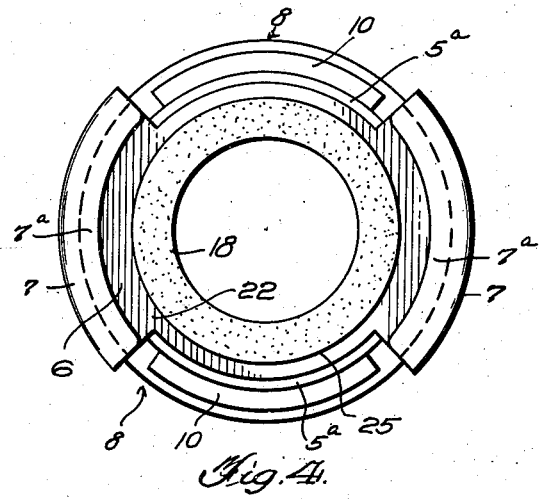
Fig. 4 is a front elevation of the structure of Fig. 3.
Figure 5:
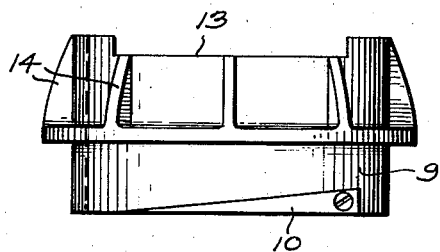
Fig. 5 is a detail view of the movable or rotatable cam carrying locking sleeve hereinafter described.

Referring to Figs. 2, 3 and 4, it will be seen that each of these sections comprise a tubular member 5 which, at its outer end, terminates in an outturned flange 6; said flange in turn carrying a pair of arcuate segments 7 each of which extends through an angle of substantially ninety degrees. Thus, spaces 8 are left between the segments 7 within which the corresponding segments of a companion coupling section may be received. It will be apparent that when the coupling sections are connected so that the spaces 8 are filled with the segments of a companion coupling, the outer surfaces of the segments will present a substantially continuous circular face, and by referring to Fig. 3 it will be seen that this face is bowed in the direction of the length of the coupling, as a whole, or in other words, is slightly rounded longitudinally of the coupling as a whole so that a riding or skid surface is presented when the coupling is dragged along the ground.

A cam carrying ring 9 is mounted to turn upon the tubular member 5, said ring comprising a pair of diametrically opposed wedge shaped cams 10. The ring 9 is disposed between a shoulder 11 formed at the forward end of the tubular member 5 and a retaining element, such as a screw 12 which takes into the tubular member 5, and is received within a cut-out or slotted portion 13 in the rear edge of the ring. This structure serves to limit the turning movement of ring 9 to such an extent that when the ring is at one of its limits of movement its cam lies beneath the corresponding segment 7, and when said ring is at its other limit of movement the cam lies across the space between the two segments 7 to engage with flanges 7a as hereinafter described. The outer face of the ring is provided with ribs 14 which serve to strengthen the locking rings; provide hand grasp portions by which a firm grip may be secured upon the rings when they are to be turned, and provide riding surfaces adapted to contact with the ground or to fend off objects with which the coupling may be dragged into contact. It will be observed that with this object in view, the ribs 14 are tapered in a direction away from the meeting faces of the coupling sections. These ribs are also adapted to be engaged by a spanner wrench.

The arcuate segments 7 are provided with inturned flanges 7a behind which the cams 10 engage, it being understood that the cams of section A engage behind the flanges 7a of section B, and the cams of section B engage behind the flanges 7a of section A. At their forward or confronting ends the tubular members 5 are provided with inturned flanges 15 and with additional thinner and somewhat shallower flanges 16; the latter having bevelled outer faces 17.

Relatively wide rubber gaskets 18 are provided with annular grooves 19 upon their rear faces for the reception of the flanges 16, the portions 20 of the gaskets being received within the groove 21 formed between the flanges 15 and 16. The rear faces of the gaskets are backed up by the flanges 15. It will be observed that the gaskets project very slightly beyond the front faces 22 of the tubular members 5 and when the sections A and B are brought together and the locking rings are manipulated to exert a pressure between these sections through the medium of the cams 10, the rubber gaskets are pressed together face to face, and in being compressed against the flanges 15 are caused to bulge slightly at their inner faces, as indicated at 23. When the water pressure comes upon these gaskets, the pressure tends to straighten these bowed portions out again with the result that the gaskets are forced into even tighter contact with each other and outward movement of the gaskets under the water pressure will cause the inclined faces 17 of the flanges 16 to wedge the tapering portions 18a of the gaskets into even tighter contact with each other, to which end a slight space is left, at 24 and 25 in the fitting of the gaskets when not under pressure.

However, a shoulder is provided, at 26, which limits the ultimate outward movement of the gaskets. Thus, the gaskets may have a limited outward movement to permit the inclined faces 17 to function and exert a wedge action upon the gaskets, but this movement is limited by the shoulders 26.

It is apparent that it would not be possible to insert the segments of section B between the segments 7 of section A, see Fig. 3, with the cams 10 in the locked position shown in said figure or in a partially locked position, because the flanges 7a of the segments of section B would strike against the front faces of the cams 10. Consequently, when placing the sections together, the cams 10 must be in their retracted position. That is to say, they must underlie the portions 7b of the coupling sections with which they are associated. Consequently, it becomes of great importance to insure that when the cams have been moved to such retracted position in the unlocking of the coupling, they will not accidentally be moved out from beneath the portions 7b in the dragging of the hose upon the ground, as for example, in the laying of fire hose, because this would interfere with the quick attachment of the companion section.

Figure 6:
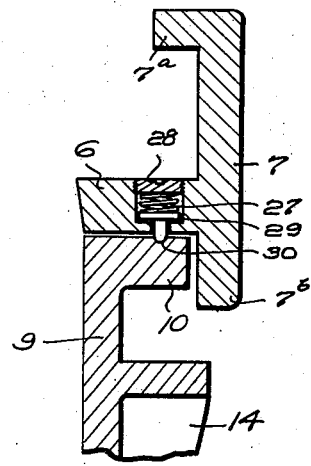
Fig. 6 is a fragmentary sectional view showing one form of locking means which may be employed and Fig. 7 is a detail sectional view on line 7—7 of Fig. 3 showing substantially the same form of locking means applied in a different place.
Figure 7:
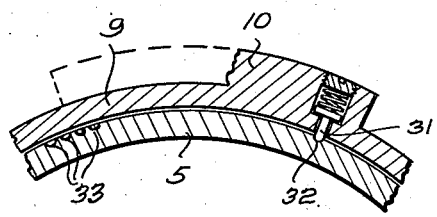

Therefore, I have provided means for holding the ring 9 in its retracted position. One of such means is illustrated in Fig. 6 where a spring 27, held in place by a countersunk plug screw 28, presses upon a detent 29 the rounded inner end of which is adapted to engage in a recess 30 formed in the forward face of cam 10. Another form of locking device is illustrated in Fig. 7 where the nose of a spring actuated detent 31, corresponding in construction to the detent 29, is adapted to engage either in a recess 32 or recesses 33 of tubular member 5 for the purpose of locking the ring either in locked or unlocked position. Such locking element may be located in one of the cams as in Fig. 7 or it may be located in a widened one of the ribs 14 as suggested in Fig. 3 where 14a is the widened rib and 28a is the countersunk plug screw.

It will be observed that in this case the detent 31 is disposed radially in the cam 10 and the ring 9, and thus I am able to make use of the extra thickness of metal provided by the rear end of cam 10 as a point of housing and reception for the detent, its actuating spring, and retaining plug. It should be observed that the inner ends of the tubular members 5 are bevelled, as indicated at 5a in Fig. 3, between the segments 7. This facilitates the entry of these portions into the companion coupling B. It will further be observed that the relatively wide faced washers are brought flat together with a straight line movement. In other words, there is no necessity for turning these washers with respect to each other nor any rubbing action of the washers upon each other. This not only prevents damage to the washers but makes it easier to connect and disconnect the coupling sections.

It is immaterial whether the hose, indicated at 35, is engaged over the outside of the tubular members 5 or whether the hose is held in place by expansion rings 35 inside of said tubular members; both methods being common in the art.

While the structure shown and described is well adapted to serve the objects sought, it is to be understood that the invention is not limited to the precise arrangement shown, but that it includes within its purview whatever changes fairly come within either the terms or the spirit of the appended claims.

Having described my invention, what I claim is:

1. A coupling comprising a pair of substantially identical sections, each of said sections comprising a tubular member having at its forward end a plurality of spaced segments provided with inturned flanges at their forward edges which lie in spaced relation circumferentially of said sections, said segments being of such length that when two of said sections are brought together the segments of one section enter between the spaces between the segments of the other section, locking rings mounted for oscillation directly upon said tubular members and provided with cams adapted to be moved across said spaces upon turning movement of said rings to engage behind the said inturned flanges of the companion sections, and means for locking said rings in retracted position to prevent accidental movement of said cams across said spaces.

2. A coupling comprising a pair of substantially identical sections, each of said sections comprising a tubular member having at its forward end a plurality of spaced segments provided with inturned flanges at their forward edges which lie in spaced relation circumferentially of said sections, said segments being of such length that when two of said sections are brought together the segments of one section enter between the spaces between the segments of the other section, locking rings mounted for oscillation directly upon said tubular members and provided with cams adapted to be moved across said spaces upon turning movement of said rings to engage behind the said inturned flanges of the companion sections, and means for locking said rings in both locked and unlocked positions.

3. A structure as recited in claim 2 in combination with means for limiting the turning movement of the locking rings to such a degree that when said rings are at one limit of movement their cams lie beneath the segments of the sections by which said rings are carried, and when at the other limit of movement said cams span the spaces between the segments of the sections by which said rings are carried.

4. A coupling comprising a pair of substantially identical sections, each of said sections comprising a tubular member having at its forward end a plurality of spaced segments provided with inturned flanges at their forward edges which lie in spaced relation circumferentially of said sections, said segments being of such length that when two of said sections are brought together the segments of one section enter between the spaces between the segments of the other section, locking rings mounted for oscillation directly upon said tubular members and provided with cams adapted to be moved across said spaces upon turning movement of said rings to engage behind the said inturned flanges of the companion sections, and a spring actuated detent housed within one of said rings and entering recesses formed at spaced points in said tubular member, said recesses being so located that the rings are locked at their limits of movement in two directions.

In testimony whereof I affix my signature.

HARALD LANGE.